(12) United States Patent
Parakulam (10) Patent No.: US 8,587,150 B2
(45) Date of Patent: Nov. 19, 2013

(54) METHOD AND MODULAR SYSTEM FOR CHARGING A BATTERY

(75) Inventor: Gopalakrishnan R. Parakulam, Cupertino, CA (US)

(73) Assignee: Deeya Energy, Inc., Fremont, CA (US)

(*) Notice: Subject to any disclaimer, the term of this patent is extended or adjusted under 35 U.S.C. 154(b) by 1107 days.

(21) Appl. No.: 12/074,110

(22) Filed: Feb. 28, 2008

(65) Prior Publication Data

US 2009/0218984 A1 Sep. 3, 2009

(51) Int. Cl.
  *H02J 1/00* (2006.01)
  *H02J 7/00* (2006.01)

(52) U.S. Cl.
  USPC ............................................. 307/72; 320/138

(58) Field of Classification Search
  USPC .................................. 307/52, 82, 72; 320/138
  See application file for complete search history.

(56) References Cited

U.S. PATENT DOCUMENTS

| | | |
|---|---|---|
| 3,540,934 A | 11/1970 | Boeke |
| 3,996,064 A | 12/1976 | Thaller |
| 4,133,941 A | 1/1979 | Sheibley |
| 4,159,366 A | 6/1979 | Thaller |
| 4,309,372 A | 1/1982 | Sheibley |
| 4,312,735 A | 1/1982 | Grimes et al. |
| 4,414,090 A | 11/1983 | D'Agostino et al. |
| 4,454,649 A | 6/1984 | Jalan et al. |
| 4,468,441 A | 8/1984 | D'Agostino et al. |
| 4,485,154 A | 11/1984 | Remick et al. |
| 4,496,637 A | 1/1985 | Shimada et al. |
| 4,543,302 A | 9/1985 | Gahn et al. |
| 4,732,827 A | 3/1988 | Kaneko et al. |
| 4,784,924 A | 11/1988 | Savinell et al. |
| 4,814,241 A | 3/1989 | Nagashima et al. |
| 4,828,666 A | 5/1989 | Iizuka et al. |
| 4,874,483 A | 10/1989 | Wakabayashi et al. |
| 4,882,241 A | 11/1989 | Heinzel |
| 4,894,294 A | 1/1990 | Ashizawa et al. |
| 4,929,325 A | 5/1990 | Bowen et al. |
| 4,945,019 A | 7/1990 | Bowen et al. |
| 4,948,681 A | 8/1990 | Zagrodnik et al. |
| 4,956,244 A | 9/1990 | Shimizu et al. |
| 5,061,578 A | 10/1991 | Kozuma et al. |

(Continued)

FOREIGN PATENT DOCUMENTS

| | | |
|---|---|---|
| DE | 102006007206 | 10/2006 |
| EP | 0 696 831 A2 | 2/1996 |

(Continued)

OTHER PUBLICATIONS

Office Action for U.S. Appl. No. 12/217,059 mailed Aug. 23, 2010.

(Continued)

*Primary Examiner* — Richard V Muralidar
(74) *Attorney, Agent, or Firm* — Haynes and Boone LLP (57) ABSTRACT

A battery charging system according to some embodiments includes a plurality of power modules coupled to a backplane, each of the plurality of power modules providing an electrical indication of type of power module to the backplane, the power modules of each type providing an electrical function associated with charging a battery consistent with the type of power module; and a controller that determines the number of power modules of a particular type and supplies control signals that allocate to each of the power modules of the particular type a portion of the electrical function.

19 Claims, 9 Drawing Sheets

(56) References Cited

U.S. PATENT DOCUMENTS

| | | |
|---|---|---|
| 5,119,011 A | 6/1992 | Lambert |
| 5,162,168 A | 11/1992 | Downing et al. |
| 5,188,911 A | 2/1993 | Downing et al. |
| 5,258,241 A | 11/1993 | Ledjeff et al. |
| 5,366,824 A | 11/1994 | Nozaki et al. |
| 5,366,827 A | 11/1994 | Belanger et al. |
| 5,648,184 A | 7/1997 | Inoue et al. |
| 5,656,390 A | 8/1997 | Kageyama et al. |
| 5,665,212 A | 9/1997 | Zhong et al. |
| 5,759,711 A | 6/1998 | Miyabayashi et al. |
| 5,847,566 A | 12/1998 | Marritt et al. |
| 5,851,694 A | 12/1998 | Miyabayashi et al. |
| 5,949,219 A | 9/1999 | Weiss |
| 6,005,183 A | 12/1999 | Akai et al. |
| 6,037,749 A | 3/2000 | Parsonage |
| 6,040,075 A | 3/2000 | Adcock et al. |
| 6,086,643 A | 7/2000 | Clark et al. |
| 6,236,582 B1 | 5/2001 | Jalaleddine |
| 6,461,772 B1 | 10/2002 | Miyake et al. |
| 6,475,661 B1 | 11/2002 | Pellegri et al. |
| 6,507,169 B1 | 1/2003 | Holtom et al. |
| 6,509,119 B1 | 1/2003 | Kobayashi et al. |
| 6,524,452 B1 | 2/2003 | Clark et al. |
| 6,555,267 B1 | 4/2003 | Broman et al. |
| 6,562,514 B1 | 5/2003 | Kazacos et al. |
| 6,692,862 B1 | 2/2004 | Zocchi |
| 6,759,158 B2 | 7/2004 | Tomazic |
| 6,761,945 B1 | 7/2004 | Adachi et al. |
| 6,764,789 B1 | 7/2004 | Sekiguchi et al. |
| 6,787,259 B2 * | 9/2004 | Colborn et al. ............... 429/430 |
| 6,905,797 B2 | 6/2005 | Broman et al. |
| 6,940,255 B2 | 9/2005 | Loch |
| 6,986,966 B2 | 1/2006 | Clarke et al. |
| 7,046,531 B2 | 5/2006 | Zocchi et al. |
| 7,061,205 B2 | 6/2006 | Shigematsu et al. |
| 7,078,123 B2 | 7/2006 | Kazacos et al. |
| 7,181,183 B1 | 2/2007 | Hennessy et al. |
| 7,184,903 B1 | 2/2007 | Williams et al. |
| 7,199,550 B2 | 4/2007 | Tsutsui et al. |
| 7,220,515 B2 | 5/2007 | Ito et al. |
| 7,227,275 B2 | 6/2007 | Hennessy et al. |
| 2003/0008203 A1 | 1/2003 | Winter |
| 2004/0070370 A1 | 4/2004 | Emura |
| 2004/0168818 A1* | 9/2004 | Layden et al. ................. 174/50 |
| 2004/0170893 A1 | 9/2004 | Nakaishi et al. |
| 2004/0202915 A1 | 10/2004 | Nakaishi et al. |
| 2004/0241544 A1 | 12/2004 | Nakaishi et al. |
| 2005/0074653 A1 | 4/2005 | Broman et al. |
| 2005/0156431 A1 | 7/2005 | Hennessy |
| 2005/0156432 A1 | 7/2005 | Hennessy |
| 2005/0158615 A1 | 7/2005 | Samuel et al. |
| 2005/0164075 A1 | 7/2005 | Kumamoto et al. |
| 2005/0181273 A1 | 8/2005 | Deguchi et al. |
| 2005/0260473 A1 | 11/2005 | Wang |
| 2006/0014054 A1 | 1/2006 | Sugawara |
| 2006/0092588 A1 | 5/2006 | Realmuto et al. |
| 2007/0072067 A1 | 3/2007 | Symons et al. |
| 2007/0080666 A1 | 4/2007 | Ritter et al. |
| 2007/0111089 A1 | 5/2007 | Swan |
| 2008/0081247 A1 | 4/2008 | Nakaishi et al. |
| 2008/0193828 A1 | 8/2008 | Sahu |
| 2009/0218984 A1 | 9/2009 | Parakulam |
| 2010/0003586 A1 | 1/2010 | Sahu |
| 2010/0090651 A1 | 4/2010 | Sahu |
| 2010/0092757 A1 | 4/2010 | Nair et al. |
| 2010/0092807 A1 | 4/2010 | Sahu |
| 2010/0092813 A1 | 4/2010 | Sahu |
| 2010/0092843 A1 | 4/2010 | Conway |
| 2010/0094468 A1 | 4/2010 | Sahu |
| 2010/0136455 A1 | 6/2010 | Winter |
| 2010/0143781 A1 | 6/2010 | Keshavarz |

FOREIGN PATENT DOCUMENTS

| | | |
|---|---|---|
| EP | 1 462 813 A2 | 9/2004 |
| JP | 60047373 | 3/1985 |
| JP | 60070672 | 4/1985 |
| JP | 60115174 | 6/1985 |
| JP | 1060967 | 3/1989 |
| JP | 1320776 | 12/1989 |
| JP | 2027667 | 1/1990 |
| JP | 2027668 | 1/1990 |
| JP | 3017963 | 1/1991 |
| JP | 8007913 | 1/1996 |
| JP | 10012260 | 1/1998 |
| JP | 10208766 | 8/1998 |
| JP | 11329474 | 11/1999 |
| JP | 2000058099 | 2/2000 |
| JP | 2000200619 | 7/2000 |
| JP | 2002015762 | 1/2002 |
| JP | 2002175822 | 6/2002 |
| JP | 2002289233 | 10/2002 |
| JP | 2002367661 | 12/2002 |
| JP | 2003173812 | 6/2003 |
| JP | 2005142056 | 6/2005 |
| JP | 2005228622 | 8/2005 |
| JP | 2005228633 | 8/2005 |
| JP | 2005322447 | 11/2005 |
| JP | 2006107988 | 4/2006 |
| JP | 2006114360 | 4/2006 |
| JP | 2006147306 | 6/2006 |
| JP | 2006147376 | 6/2006 |
| JP | 2006313691 | 11/2006 |
| JP | 2006351346 | 12/2006 |
| JP | 2007087829 | 4/2007 |
| WO | 8905528 | 6/1989 |
| WO | 9003666 | 4/1990 |
| WO | WO 00/17991 A1 | 3/2000 |
| WO | 03005476 | 1/2003 |
| WO | 2004079849 | 9/2004 |
| WO | 2006135958 | 12/2006 |

OTHER PUBLICATIONS

Office Action for U.S. Appl. No. 12/577,137 mailed Sep. 7, 2010.
Final Office Action for U.S. Appl. No. 12/577,127 mailed Aug. 19, 2010.
Office Action for U.S. Appl. No. 11/674,101 mailed Apr. 9, 2010.
Search Report for PCT Application No. PCT/US2008/53601.
Written Opinion for PCT Application No. PCT/US2008/53601.
IPRP for PCT Application No. PCT/US2008/53601.
Search Report for PCT Application No. PCT/US2009/060279.
PCT International Search Report and the Written Opinion mailed Jun. 26, 2009, in related International Application No. PCT/US2009/001303.

* cited by examiner

METHOD AND MODULAR SYSTEM FOR CHARGING A BATTERY

BACKGROUND

1. Field of the Invention

The present invention generally relates to battery chargers, and more specifically, to a method and system for charging a battery.

2. Discussion of Related Art

Battery chargers for recharging batteries are generally well known. In general, the battery charger reverses the chemical discharge of stored electrical energy in the battery that is being charged. The recharging processes typically involves putting a current through the battery in such a way that electrical energy is then chemically stored in the battery.

In a flow battery system, for example, a battery cell may include two electrodes, each immersed in an electrolyte. The two electrolytes are separated by a membrane. The battery is discharged when current flows between the terminals and a charged ion is transported across the membrane. The electrolytes are flowed through the battery so that the amount of stored energy is not determined by the size of the cell itself. The battery is charged when a current is supplied between the terminals and the charged ion is transported back across the membrane, charging the two separated electrolytes in the cell. The electrical energy is thereby stored by appropriately charging the two electrolytes.

Battery charging processes typically depend on the energy storage capacity of the battery, the internal resistance of the battery, and other factors. The energy storage capacity of the battery determines the amount of charge required to fully charge the battery while the internal resistance, which will cause heating, determines the maximum current that can be supplied to the battery without overheating and damaging the battery. Further, the voltage across the battery cell may be limited during charging in order that the battery cell is not damaged by overcharging.

Flow batteries can be tailored for particular electrical storage needs. Therefore, each battery may have different charging requirements. There is a need for battery chargers that are easily configurable to the battery system in which they are employed.

SUMMARY

In accordance with embodiments of the present invention, a modular battery charger system is presented. Embodiments of a battery charger according to the present invention can include a plurality of power modules coupled to a backplane, each of the plurality of power modules providing an electrical indication of type of power module to the backplane, the power modules of each type providing an electrical function associated with charging a battery consistent with the type of power module; and a controller that determines the number of power modules of a particular type and supplies control signals that allocate to each of the power modules of the particular type a portion of the electrical function.

A method of charging a battery according to the present invention can include determining a number of charging modules that are coupled to a backplane; determining a charging current; adjusting a current output of each of the number of charging modules to supply the charging current; and applying the charging current to a battery.

These and other embodiments of the present invention are further described below with reference to the following figures.

In the figures, elements having the same designation have the same or substantially similar function. The figures are illustrative only and relative sizes and distances depicted in the figures are for convenience of illustration and have no further meaning.

DETAILED DESCRIPTION

Figure 1A:
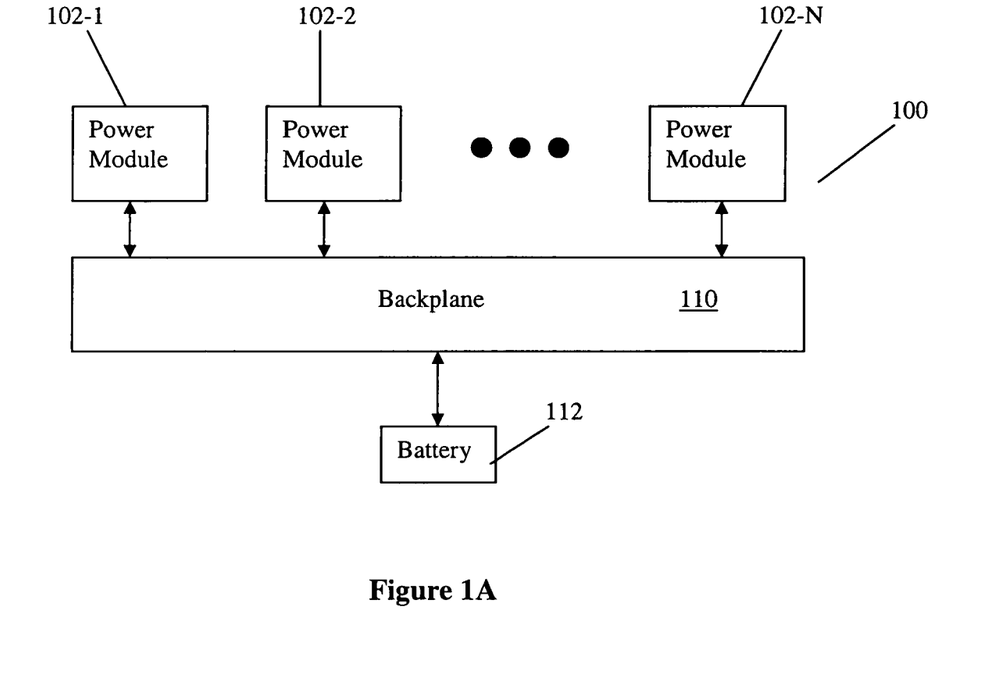
FIG. 1A illustrates a modular battery charger according to some embodiments of the present invention.

FIG. 1A illustrates a modular battery charger 100 according to some embodiments of the present invention. Modular battery charger 100 includes any number of power modules 102, of which power modules 102-1 through 102-N, where N is the total number of power modules, are shown (referred to collectively as power modules 102). Each of power modules 102 is coupled to a backplane 110. Backplane 110 is further coupled to a battery 112. Battery 112 receives a charging current from backplane 110 during charging.

In some embodiments of the invention, power modules 102 are each formed on a circuit board and then inserted into one of a plurality of slots (not shown in the figure) in backplane 110. As such, backplane 110 can include an array of slots that receives power modules 102. Power modules 102 may have multi-pin (alternatively referred to as terminals) edge connectors through which electrical connections are made with backplane 110.

Modular battery charger 100 may be conveniently configured to charge a particular battery 112 by insuring that particular numbers of power modules 102 of particular types are inserted into backplane 110. As such, modular battery charger 100 may include any number of power modules 102.

Battery 112 may receive electrical energy from one or more of power modules 102 through backplane 110. In some embodiments, modular battery charger 100 may be coupled to more than one battery. Further, battery 112 can be any type of battery. Battery charger 100 may, for example, be a flow type battery. In general, battery 100 may be any device that stores electrical energy in any form, for example as chemical energy, mechanical energy, or directly as electrical energy.

Each of power modules 102 shown in FIG. 1A performs an electrical function associated with the charging of battery 112. Power modules 102 may include, for example, one or more modules from among the various types of modules. The types of power modules 102 include, for example, charger modules, rectifier modules, buck-boost modules, sensor-interface modules, and controller modules. Each of power modules 102 are coupled to backplane 110 through one or more terminals (or pins), through which they receive or supply one or more electrical signals to backplane 110. For example, power module 102-$k$ (an arbitrary one of power modules 102) may be a rectifier module that receives an AC voltage across two input terminals and provides a fixed DC voltage across two output terminals. Additionally, each of power modules 102 may include one or more terminals for sensing signals and one or more terminals for receiving control signals or providing control signals to backplane 110.

Some embodiments of modular battery charging system 100 can be utilized to improve reliability, maintainability, and flexibility of battery charging system 100. Each of power modules 102 performs one or more electrical functions associated with charging battery 112, monitoring the charge on battery 112, or supplying power to back-plane 110 and others of modules 102. As indicated above, power modules 102 can include rectifier modules, charger modules, buck-boost modules, sensor-interface modules, and controller modules. Power modules 102 can include other types of modules as well. As such, an embodiment of modular battery charging system 100 can be tailored to meet the needs of any particular battery 112 to be charged.

To provide redundancy, multiple power modules of any given power module type may be utilized in a particular modular battery charging system. For example, power modules 102 may include multiple charger modules to ensure that the modular battery charging system continues to be functional even if one or more of the charger modules fails. Redundancy may be provided by either operating only one operational power modules among the multiple power modules of the same power module type at a time or by simultaneously operating multiple operational power modules of a particular power module type. For example, multiple charger modules may be operating simultaneously to provide, in sum, a total output charging current to charge battery 112. Each charger module among the power modules 102 of modular battery charging system 100 provides a part of the total output charging current. As such, an electrical function of providing the total charging current is shared among the multiple active charger modules.

Figure 1B:
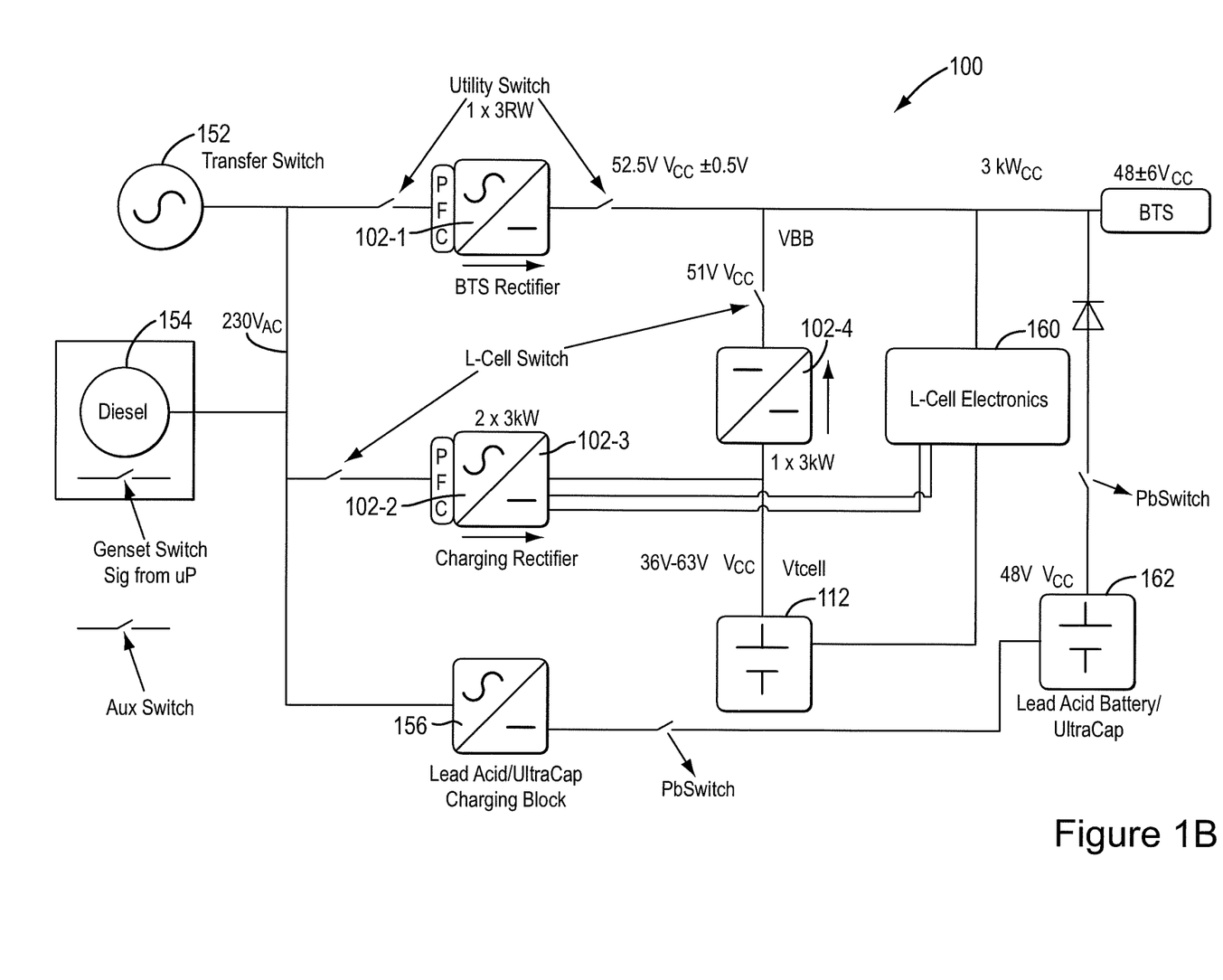
FIG. 1B illustrates a particular example of a charging system according to the present invention.

FIG. 1B shows an example of charger system 100 according to some embodiments of the present invention. As shown in FIG. 1B, power is received either from an external power line 152 or a diesel generator 154. In general, external power can be received from any source, including a power grid or dedicated generator such as a solar, tidal, wind, or other form of generator. The example of charger system 100 shown in FIG. 1B includes one rectifier power module, power module 102-1, two charging power modules, i.e., power module 102-2 and power module 102-3, and a buck-boost module, i.e., power module 102-4. Electronics 160 controls power modules 102-1 through 102-4 in order to charge battery 112. Additionally, a lead-acid battery 162 and lead acid battery charger 156 are shown. In some systems, for example where battery 112 may not provide sufficient instantaneous current to start a device such as a motor, a lead acid battery such as battery 162 can be provided.

FIGS. 2 through 5 illustrate certain aspects of some embodiments of charger and rectifier power modules. These embodiments are illustrated here for illustrative purposes and are not intended to limit the scope of the invention in any way.

Figure 2:
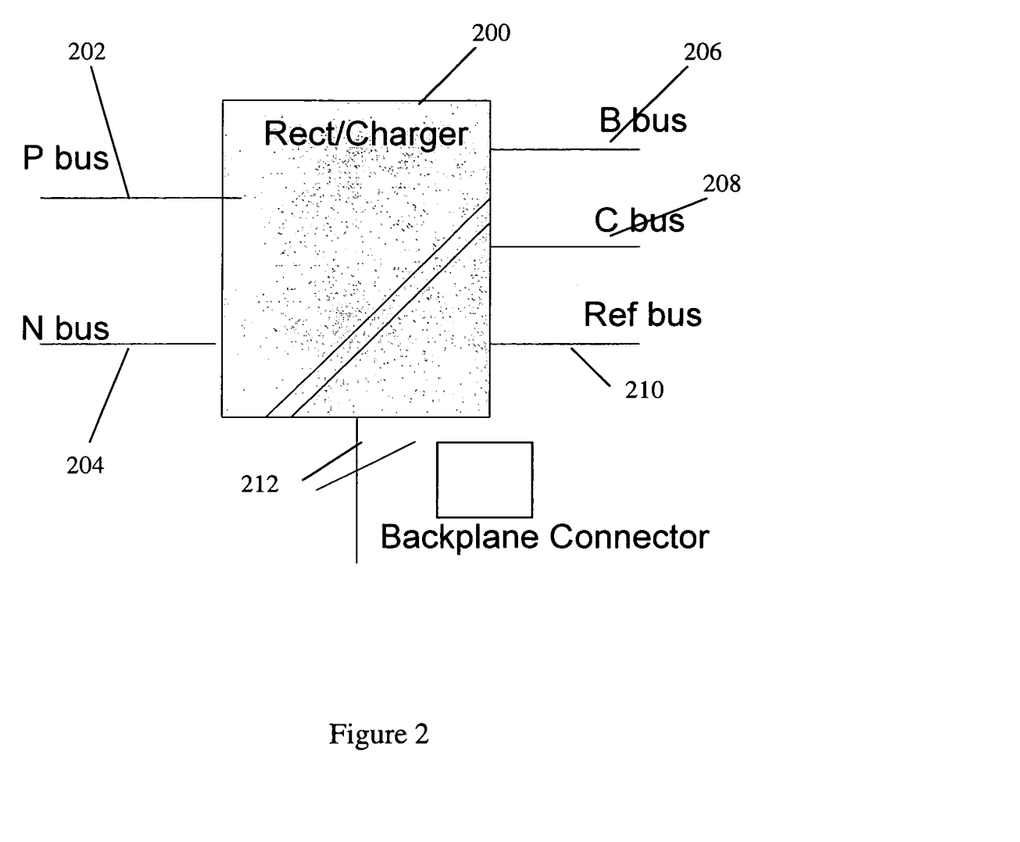
FIG. 2 illustrates a rectifier or charger power unit according to some embodiments of the present invention.

FIG. 2 illustrates a power module 200 that can be utilized as one of power modules 102 in FIG. 1. Power module 200 shown in FIG. 2 is a rectifier/charger module and can be configured as either a rectifier module or a charger module. Typically, both a rectifier and a charger module receives a fixed voltage between the P input bus 202 and the N input bus 204. N input bus 204 is the neutral bus while P input bus 202 is the phase line of an incoming power line. An output voltage is output to backplane 110 through either B-bus 206, which is coupled to the B bus of backplane 110, or C bus 208, which is coupled to the charging bus in backplane 110, depending on whether power module 200 is configured as a rectifier module or a charger module, respectively. The B bus in backplane 110 is coupled to provide power to backplane 110 and other power modules 102. The charging bus of backplane 110 is coupled to provide charging current to battery 112. A reference bus 210 provides a common voltage line in backplane 110. Further, control buses 212 are also utilized to couple power module 200 to backplane 110 and include control and monitoring lines.

In some embodiments of flow battery systems, when power module 200 functions as a rectifier, it receives a fixed input voltage and outputs a fixed output voltage, for example 50V, on B bus 206. In some embodiments, power module 200 acting as a rectifier can provide as much as 60 A of current. When power module 200 functions as a rectifier, connections are made between backplane 110 and P bus 202, N bus 204, Reference bus 210, and B bus 206.

In some embodiments, when power module 200 functions as a charger, a fixed AC input voltage is supplied between P bus 202 and N bus 204. A fixed output voltage is supplied to C bus 208 in response to control signals from backplane 110. The output voltage can have a range of voltages. In some embodiments, for example, the output voltage on C bus 208 can range from about 30 V to about 70 V. The output current supplied to C bus 208 is variable depending on the status of charging system 100. When power module 200 functions as a charger, connections are made between backplane 110 and P bus 202, N bus 204, Reference bus 210, and C bus 208.

As is discussed above, a difference between a rectifier and a charger includes the connection to B bus 206 or C bus 208. Another difference is the settings of output voltage and current supplied by power module 200. In other words, some embodiments of power module 200 can be configured as a rectifier by connecting to B bus 206 and appropriately adjusting the voltage and current settings and can be configured as a charger by connecting to C bus 208 and appropriately adjusting the voltage and current settings.

Figure 3:
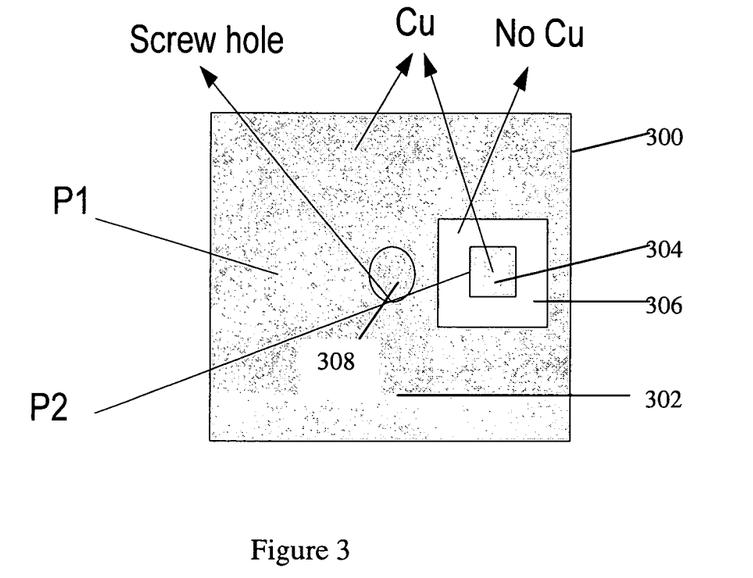
FIG. 3 illustrates a pad land pattern for a rectifier or charger power unit bus according to some embodiments of the present invention.

FIG. 3 illustrates a land pattern for a pad 300 that can be utilized for coupling output terminals of power charger 200 B bus 206 and C bus 208 of to backplane 110. As is shown in FIG. 3, pad 300 includes a first metallic cladded area 302 and a second metallic cladded area 304 surrounded by non-cladded area 306 in first metallic cladded area 302. First metallic cladded area 302 can be utilized to make electrical contact with the electronics of power module 200. Second metallic cladded area 304 can be utilized to make electrical contact with monitoring circuitry 400, shown in FIG. 4. In order to complete the electrical contact between pad 300 and backplane 110, a conducting bus bar blade (not shown) can be inserted, connected between first cladded area 302 and second cladded area 304. A bus bar blade can be a rigid conducting piece that electrically couples pad 300 to a bus. In the embodiment shown in FIG. 3, a bus bar blade can be firmly attached to pad 300 by a screw inserted into screw hole 308 such that a portion of the bus bar blade is held in contact with second cladded area 304. As one skilled in the art is aware, other arrangements can also be utilized to electrically couple first cladded area 302 with second cladded area 304 and backplane 110 if pad 300 is to be utilized.

Utilizing pad 300 as shown in FIG. 3 in the B-bus 206 terminal of power module 200 shown in FIG. 2, a bus bar blade utilized to make the connection to B-bus 206 if power module 200 is being configured as a rectifier module also couples first cladded area 302 (P1) with second cladded area 304 (P2). A pad such as pad 300 can also be utilized in the connection to C-bus 208 if power module 200 is being configured as a charger module. Similarly, when the bus bar blade is utilized to make the connection to C bus 208, the bus bar blade also makes connection between cladded areas 302 and 304.

Figure 4:
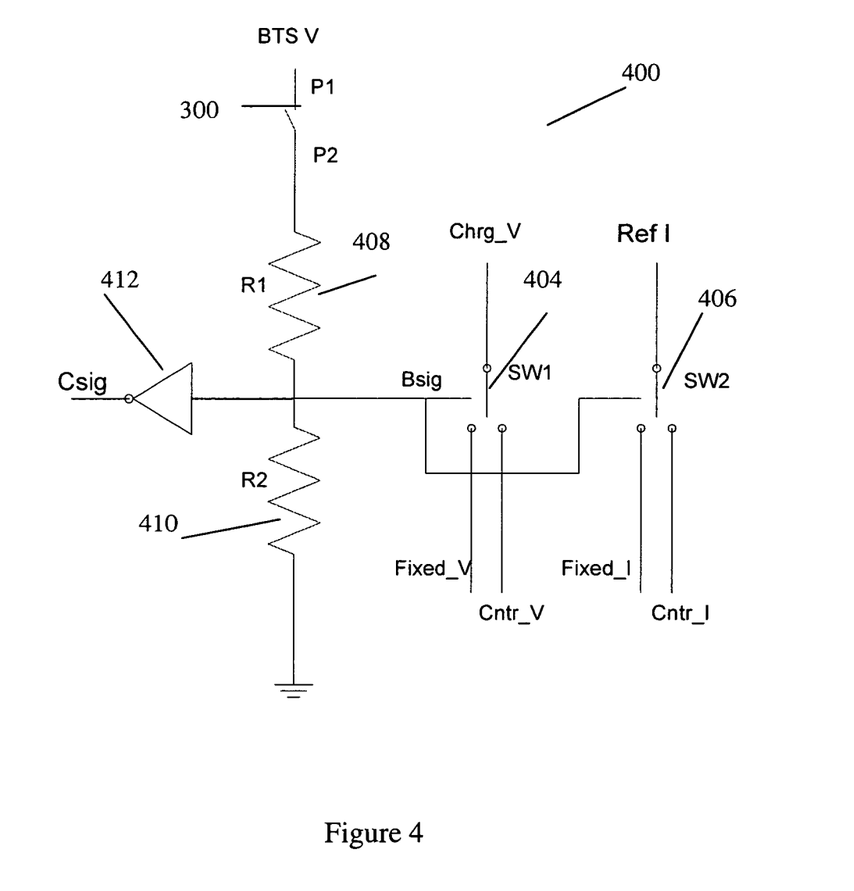
FIG. 4 illustrates an equivalent circuit when a bus bar blade is utilized to determine the type of the power module shown in FIG. 2.

FIG. 4 shows an equivalent circuit 400 illustrating an embodiment of power module 200 when power module 200 is configured as a rectifier by installing a bus bar blade to connect to B bus 206. As shown in FIG. 4, pad 300 is represented by a switch between points P1 (cladded area 302) and P2 (cladded area 304). The voltage BTS V provided by power module 200 is supplied to first cladded area 302 and, if the bus bar blade is installed, the switch is closed and voltage V is supplied to B bus 206 and to electrical circuit 400.

As further shown in FIG. 4, a voltage divider having resistors R1 408 and R2 410 provide a signal Bsig that has a voltage proportional to the voltage V. When the bus bar blade is installed and pad 300 is closed, the signal Bsig is held at a voltage determined by resistors 408 and 410, for example 5 volts. If the bus bar blade is not installed, the signal Bsig is grounded through resistor 410 and has value 0. In some embodiments of the invention, power module 200 is configured to be either a charger module or a rectifier module. If Bsig is 0, then power module 200 is assumed to be a charger module and a signal Csig, through an inverter 412, is asserted. In some embodiments of the invention, a similar circuit to that shown in FIG. 4 can be implemented on C bus 208 and the signal Csig can be independently determined.

As shown in FIG. 4, the signal Bsig is provided to switches SW1 404 and SW2 406. Switches SW1 404 and SW2 406 determine signals Chrg_V and Ref I. If Bsig is 0, indicating that no bus bar blade has been installed on pad 300, then a voltage Cntr_V is coupled to Chrg_V and a voltage Cntr_I is coupled to Ref_I. If Bsig is non-zero, for example 5V, indicating that the bus bar blade has been installed in pad 300 and that voltage V is coupled to B bus 206, then a voltage Fixed_V is connected to voltage Chrg_V at SW1 404 and a voltage Fixed_I is connected to voltage Ref_I at SW2 406. Voltages Contr_V, Contr_I, Fixed_V, and Fixed_I are provided to power module 200 from a controller.

The voltage Fixed_V can be generated using fixed resistors and is proportional to the voltage on B bus 206. The voltage Fixed_I can also be generated by fixed resistors and is proportional to the maximum current output on B bus 206. The voltage Cntr_V is generated by a controller board and utilized to control a charging power module. The voltage Cntr_I is proportional to the output current generated by the controller board and is utilized to determine the charging current to be supplied by power module 200 if power module 200 is configured as a charging module.

Figure 5:
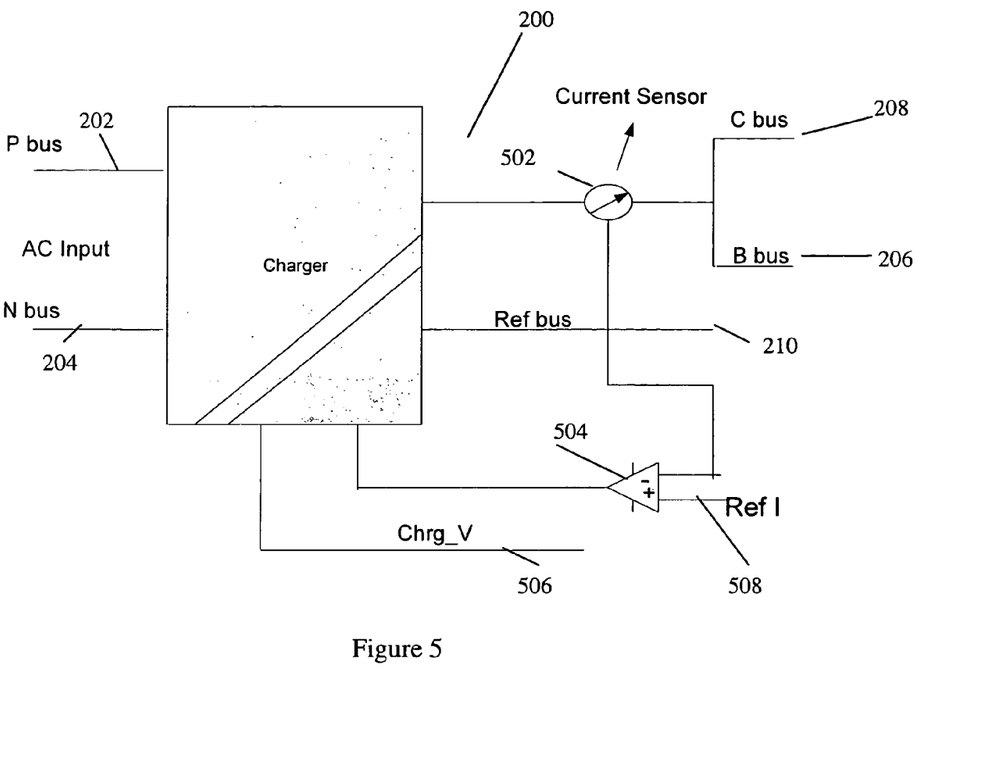
FIG. 5 illustrates control circuits for a power module according to some embodiments of the present invention.

FIG. 5 illustrates the output stage of a charger/rectifier power module 200 as illustrated in FIG. 2. As shown in FIG. 5, a current sensor 502 coupled between power module 200 and C bus 208 or B bus 206 provides a signal that is indicative of the current output from power module 200. The signal from current sensor 502 is compared with the Ref_I signal in a comparator 504 and an error signal is provided to power module 200. Furthermore, the voltage Chrg_V is input to power module 200. Power module 200 provides a current and a voltage in response to the error signal from comparator 504 and the Chrg_V signal. The Ref_I signal and the Chrg_V signal are determined by a controller, which may be another power module 102 or may be incorporated in backplane 110, based on the status of system 100.

The signal Cntr_I, which as shown in FIG. 4 determines the signal Ref_I in power module 200 if power module 200 is configured as a charging module, is determined by the controller based on the number of power modules 102 that are configured as charging modules. The signal Cntr_I also is dependent on whether a fault condition has been detected in any of the charger modules.

Power modules 102 can be electrically coupled to backplane 110 through an edge connector on power module 102 that mates with a compatible backplane connector on backplane 110. In some embodiments, two pins on the backplane connector are dedicated to each type of power module 102. For example, two pins are dedicated to buck boost modules, different two pins are dedicated to rectifier modules, and yet another two pins are designated for charger modules. The presence or absence of a particular type of power module 102 can be determined by monitoring the dedicated bus lines coupled to the dedicated pins associated with that type of power module 102. Each active power module 102 can provide a signal on the dedicated pins associated with its type. In some embodiments of the present invention, each of power modules 102 couples a resistor of predetermined value across the appropriate pair of pins to indicate its presence. As such, a resistive connection between the two pins dedicated for a particular type of power module indicates to a controller the presence of that type of module. For example, a charger can be indicated by the existence of a resistor between two particular pins on the backplane connector. The number of chargers present is then indicated by the number of parallel resistors present between those two pins on the backplane connector.

Figure 6A:
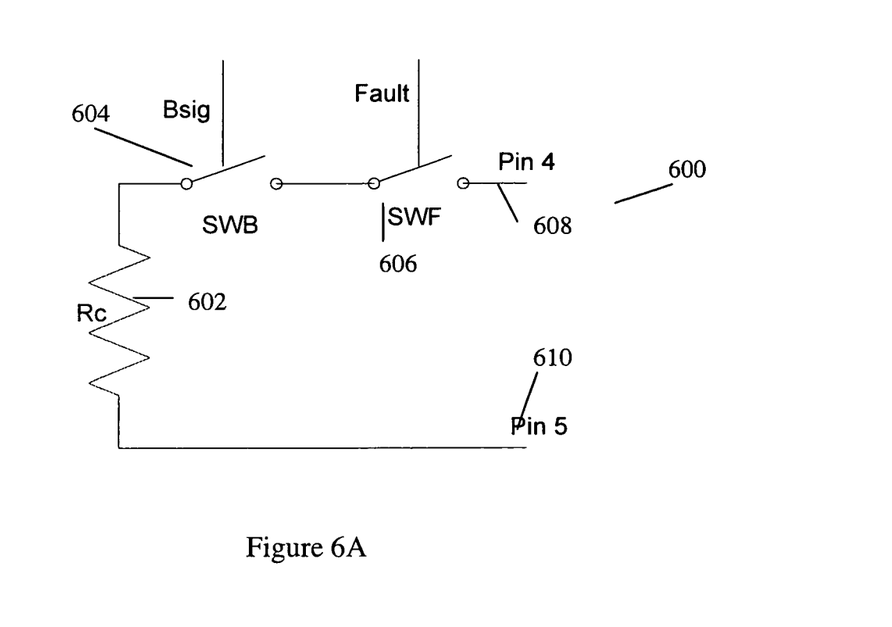
FIGS. 6A and 6B illustrate resistance couplings for a rectifier and a charger power module, respectively.
Figure 6B:
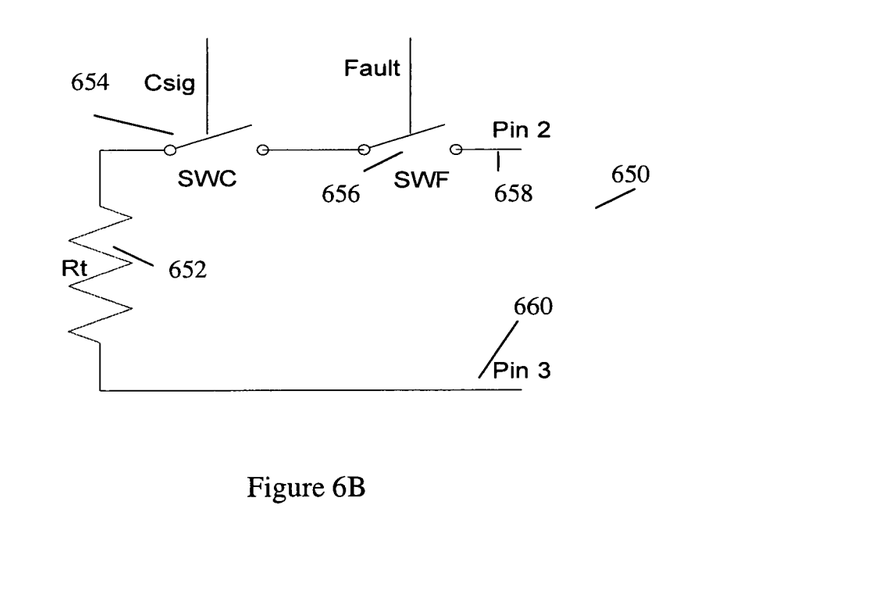

FIGS. 6A and 6B illustrate resistance coupling for a rectifying module 600 and for a charging module 650, respectively. As shown in FIG. 6A, if the Bsig signal is active, then switch 604 is closed. If no faults are detected with rectifying module 600, then a switch 606 is also closed. When both switch 604 and switch 606 are closed, resistor 602 is coupled between pins 608 and 610. As shown in FIG. 4, Bsig is active when power module 200 is configured as a rectifier.

Similarly, as shown in FIG. 6B, a resistor 652 of charging module 650 is connected between a pin 658 and a pin 660 when a switch 654 and a switch 656 are closed. Switch 654 is closed in response to the Csig signal, which is generated when charging module 650 is configured as a charging module.

Figure 7:
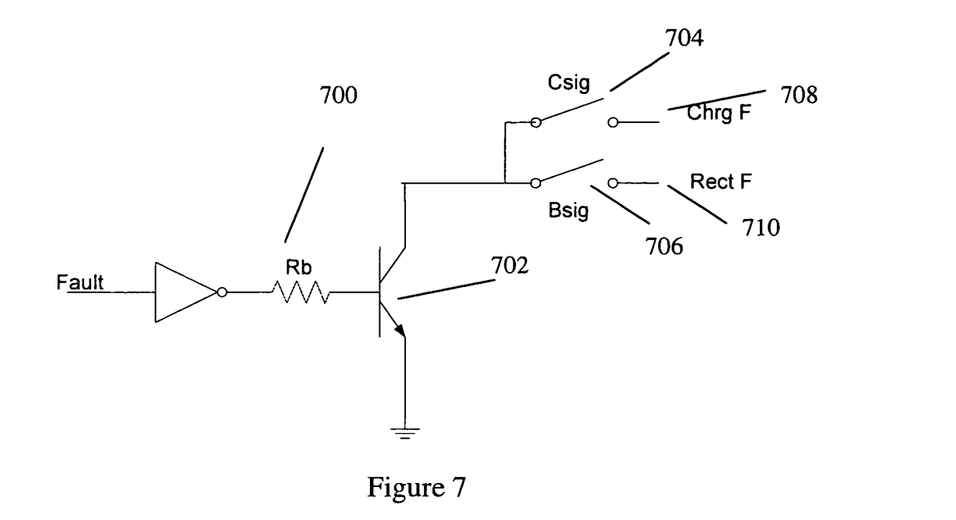
FIG. 7 illustrates a fault signal generation circuit that can be utilized to indicate a fault in a power module.

FIG. 7 illustrates a fault signal generation circuit 700. A fault signal can be generated, for example, if there is no output voltage and no current drawn from a power module 200. Opening switch 606 in a rectifier module or switch 656 in a charging module indicates to the controller board that the power module 600 or 650, respectively, is no longer available. Also, an open collector signal is coupled to the backplane at a pin 708 or a pin 710, depending on whether the signal Csig closes a switch 704 or signal Bsig closes a switch 706. A fault signal on pins 708 or 710 indicates that power module 200 has failed, a fault on pin 708 indicating that power module 200 is a failed charging module and a fault on pin 710 indicating that power module 200 is a failed rectifier module. Each power module 200 that is a charger or rectifier power module can include two pin connections, one for a charger fault and one for a rectifier fault signal. As shown in FIG. 7, once a fault signal is generated, it is utilized to power the gate of a transistor 702. The collector of transistor 702 is coupled to the fault detection pin 704 so that the fault can be detected by controller 160.

Figure 8:
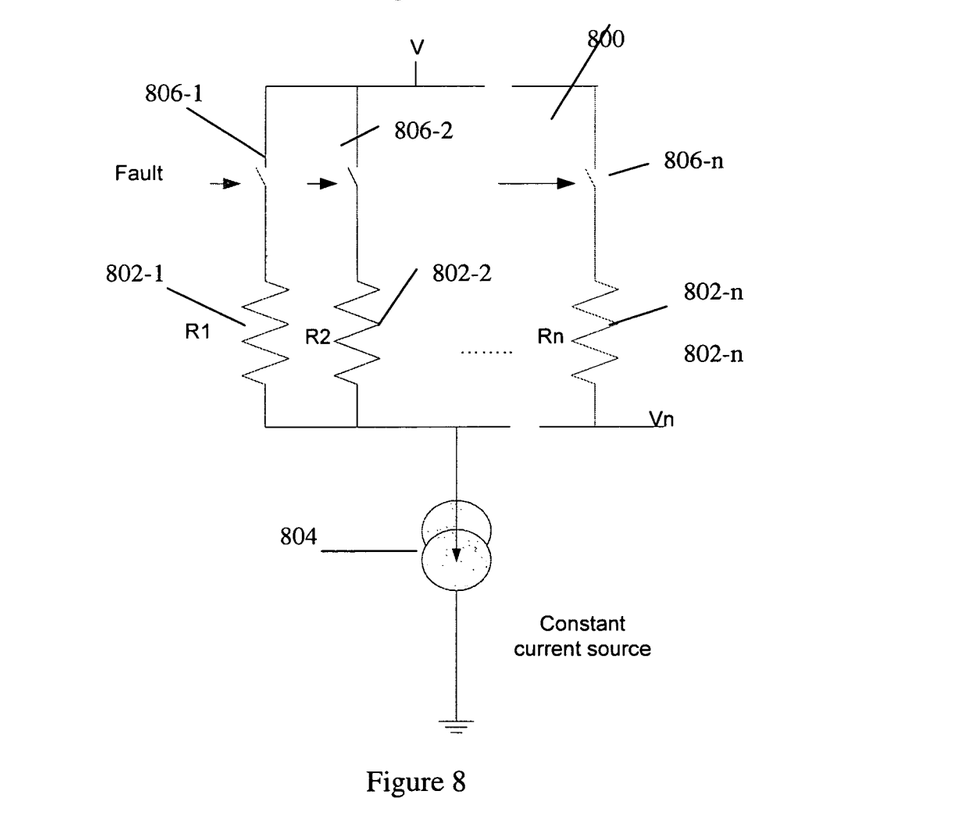
FIG. 8 illustrates the sensing circuit utilized to determine the number of power modules configured as a particular type of power module according to some embodiments of the present invention.

FIG. 8 illustrates a sensing circuit for determining the number of power modules 202 of a particular type. Each active power module 202 of a particular type has a resistor of a known value coupled between a known pair of pins. As shown in FIG. 8, each of resistors 802-1 through 802-$n$ are coupled in parallel between the two lines on backplane 110 that correspond to the two pins. Typically, resistors 802-1 through 802-$n$ have the same resistance, i.e. R1=R2=...=Rn. A controller card can then provide a voltage to one of the two pins in backplane 110, and couple a constant current source 804, which draws current Icc to ground, from the opposite of the two pins in backplane 110. The voltage Vn, is then proportional to the number of resistors, and hence the number of active power modules 202 of a particular type, that are coupled to backplane 202. As shown in FIG. 8, Vn=V−Icc(R/n). In some embodiments, the voltage Vn can be utilized as a control voltage, for example control voltage Cntrl_V shown in FIG. 5 if circuit 800 is detecting charging modules. As further shown in FIG. 8, fault switches 806-1 through 806-$n$ (which can be switches 606 or 656 shown in FIG. 6A or 6B) can be utilized to remove individual ones of power modules 202, and the reduction in the number of active power modules of a particular type detected by circuit 800 will be detected in voltage Vn.

As discussed above, provision of an electrical function can be shared among multiple power modules 102 in the modular battery charging system 100. Some embodiments of the present invention automatically configure each power module to provide one or more of an output voltage and an output current according to the current power requirements. For example, because provision of the total charging current to be supplied to battery 112 can be shared among the multiple charger modules, a portion of the charging current provided by each charger module can be determined. Further, power modules 102, regardless of power module type, may be inserted in any of the available slots on the backplane. Some embodiments of the present invention can identify a power module inserted in a slot.

As discussed above, a predefined set of electrical properties asserted on one or more terminals of each power modules 102 is sensed to determine the type of that power module. Subsequently, a number of operational power modules corresponding to a particular type of power module 102 is determined, and based on the number of operational power modules, each power module corresponding to the power module type is configured to perform a portion of the charging task performed by that type of power module 102. In some embodiments, all of the duties for a particular module type can be allocated to one module. In other embodiments, the duties of a particular module type can be distributed across all active modules of that type.

The electrical energy received by battery 112 is based on a power requirement for modular battery system 100. The power requirement corresponds to a charging voltage and a charging current provided to battery 112. Each of the charging voltage and the charging current is determined by factors which include, but are not limited to, rate of charging, and charge capacity of battery 112. Other factors that may effect the charging voltage and charging current include the number of battery cells in battery 112 and the rate of generation of hydrogen during the charging process.

Each of power modules 102 may be simultaneously operational. Additionally, each of power modules 102 configured as a charging module may provide a corresponding output current which, in sum, constitutes the charging current received by battery 112. In other words, each of charging modules of the power modules 102 may be configured to provide a fraction of the charging current.

Figure 9:
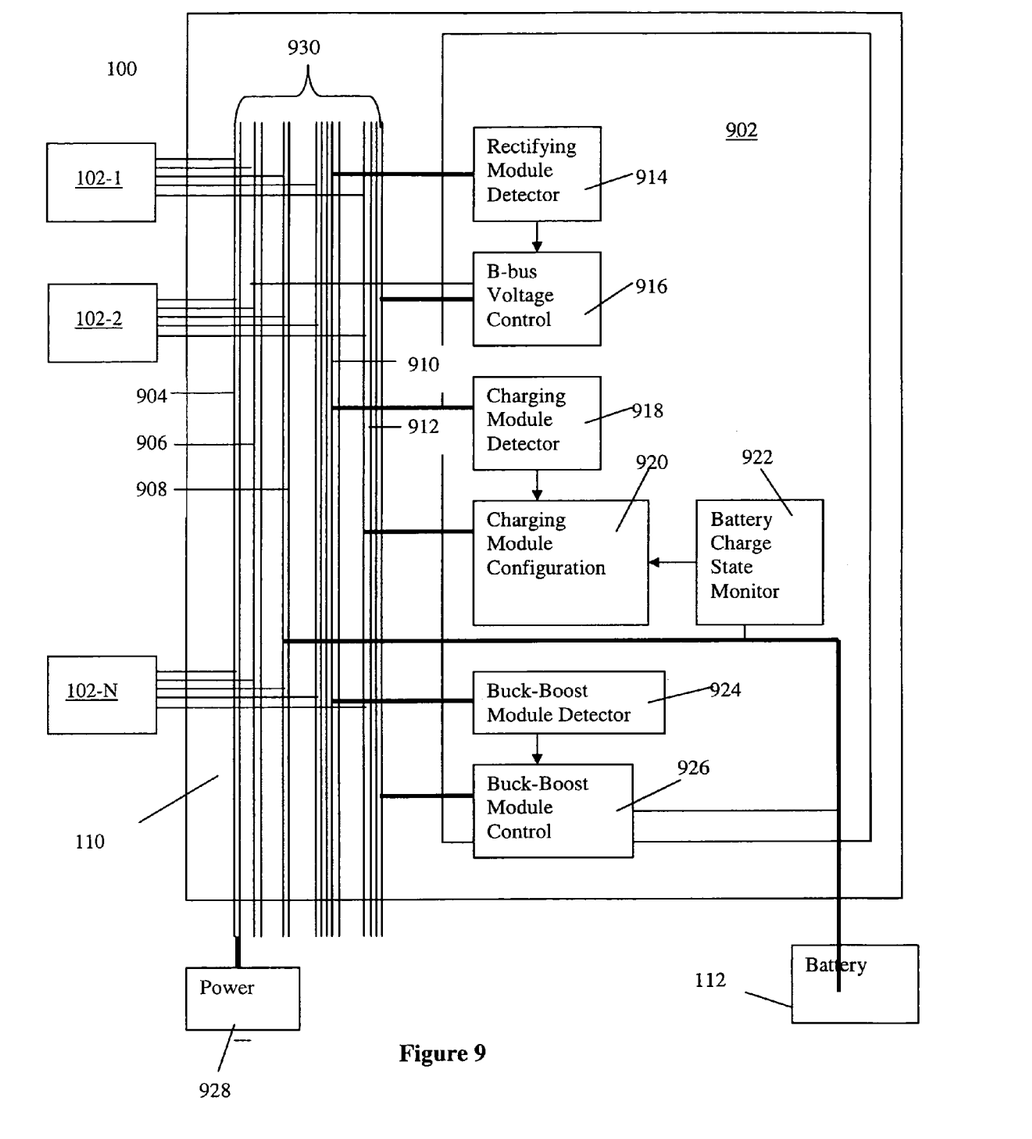
FIG. 9 illustrates an embodiment of a controller for a charging system according to some embodiments of the present invention.

FIG. 9 illustrates a controller 902 that can be included in backplane 110 according to some embodiments of the present invention. In some embodiments, and as shown in FIG. 9, controller 902 can be included within backplane 110. In some embodiments, controller 902 may be one or more of power modules 102 and can utilize one or more of the slots of backplane 110. Controller 902 may be implemented in any fashion, for example in hardware, software, or a combination of hardware and software.

As shown in FIG. 9, backplane 110 includes conducting backplane lines 930, each of which corresponds to a terminal on power modules 102. Backplane lines 930 includes power lines 904, internal power lines 906, charging current lines 908, module identification lines 910, and control lines 912. In general, there may be any number of lines 930. Further, each type of line may include any number of individual lines.

Power lines 904 may be coupled to an external power source 928 such as a power grid or generator. Power lines 904, for example, can be coupled to P bus 202 and N bus 204 as shown in FIG. 2.

Internal power lines 906 provide power for controller 902 and for power modules 102. Internal power lines 906, for example, may be coupled to B bus 206 and reference bus 210 shown in FIG. 2. Power supplied to power lines 906 can be provided by rectifier modules included as power modules 102.

Charging current lines 908 provide the charging current used to charge battery 112. Charging current lines 908, for example, can be coupled to C bus 208 shown in FIG. 2. Current supplied to charging current lines 908 can be provided by charging modules included as power modules 102.

Module identification lines 910 are utilized to identify the number of types of power modules 102 that are coupled to backplane lines 916. As discussed above, each type of power module 102 provides an electrical signal on one or more of module identification lines 910. As shown in the embodiment illustrated in FIGS. 6A and 6B, for example, each type of power module 102 can provide a resistance between two of module identification lines 910 that are dedicated to that type of power module 102. Power modules 102 according to embodiments of the present invention can utilize any indication of its type of module identification lines 910, including, for example, a resistance, a capacitance, or other electrical signal.

Control lines 912 are utilized to control aspects of power modules 102. For example, the Cntrl_V and Cntrl_I signals shown in FIG. 5 may be carried on control lines 912.

As shown in FIG. 9, controller 902 includes electronics to monitor and control power modules 102. For example, a rectifying module detector 914 receives signals from module identification lines 910 and determines the number of power modules 102 that are configured as rectifying modules. A B-voltage control 916 receives the number of rectifying modules from rectifying module detector 914, monitors the voltage on input power lines 906 (the B bus), and provides control signals to control lines 912 to control the voltage and current output from each of power modules 102 configured as a rectifier module.

Similarly, a charging module detector 918 is coupled to module identification lines 910 and detects the number of power modules 102 that are configured as charging modules. A charging module configuration 920 is coupled to control lines 912 to control the current output of the power modules 102 configured as charging modules in response to the number of charging modules and signals from battery charge state monitor 922. A battery charge state monitor 922 is coupled to charging current lines 908 in order to monitor the current and voltage supplied to battery 110. Charging module configuration 920 controls the current supplied by charging modules, with each of the charging modules providing a portion of the current, in order to control the charging of battery 110.

A buck-boost module detector 924 is coupled to module identification lines 910 and determines the number of buck-boost voltage modules included in power modules 102. A buck-boost module control 926 receives the number of buck-boost modules from buck-boost module detector 924, monitors the voltage of current lines 908, and controls the buck-boost modules in order to share control of current lines 908, which can be utilized in both charging and discharging battery 112. The buck boost module can be made bidirectional and then can control the charging using the above technique.

For each type of power module 102, the total load required to fulfill the charging duty can be shared between the number of modules present. For example, the current required to charge battery 110 can be split between the number of available charging modules. As another example, the voltage and current supplied to internal power lines 906 can be split between the number of rectifying modules included in power modules 102.

As illustrated in FIG. 9, in some embodiments of charging system 100 according to the present invention, backplane 110 can determine the number of each type of power module available in power modules 102, independently of where those modules are actually inserted into the slots of backplane 110. Further, in some embodiments, the charging load for each type of power module is distributed between all available power modules of that type in power modules 102. Further, if one or more of power modules 102 fail, that failure is detected and represented as a decrease in the number of available modules of that type. The load requirements are then redistributed amongst the remaining available power modules of that type.

B-bus voltage control 916, charging module control 920, and buck-boost module control 926 may utilize any type of feedback loop, including analog or digital loops (eg: RS232, I2C, SPI, or other forms of control). Further, controller 902 may include processors where B-bus voltage control 916, charging module control 920, and buck-boost module control 926 are implemented in software, hardware, or a combination of software and hardware.

The embodiments described above are illustrative of the invention only and are not intended to be limiting. Those skilled in the art will recognize variations from the embodiments described above, which are intended to be within the scope of this disclosure. As such, the invention is limited only by the following claims.

What is claimed is:

1. A battery charging system, comprising:
a plurality of power modules of a plurality of types coupled to a backplane, each of the plurality of power modules providing an electrical indication of the type of each power module to the backplane when coupled through module identification lines in the backplane, the power modules of each type providing one of a plurality of electrical functions associated with the type and associated with charging a particular type of battery consistent with the type of power module, at least one of the plurality of power modules being configured for charging a flow type battery; and
a controller that determines the number of power modules of a particular type from the cumulative effects of the electrical indications from each power module of the particular type and supplies control signals that allocate to each of the power modules of the particular type a portion of the electrical function.

2. The charging system of claim 1, wherein the particular type is rectifier modules.

3. The charging system of claim 2, wherein the electrical function is providing power to an internal bus in the backplane.

4. The charging system of claim 1, wherein the particular type is charging modules.

5. The charging system of claim 4, wherein the electrical function is providing charging current over charging current lines in the backplane.

6. The charging system of claim 5, wherein the controller monitors the charging current, and controls the charging modules so that each of the number of charging modules provides an equal portion of a required charging current.

7. The charging system of claim 1, wherein the plurality of power modules includes one or more types of power modules chosen from a set of types consisting of rectifier modules, charging modules, buck-boost modules, sensor modules, and controller modules.

8. The charging system of claim 7, wherein the controller determines the number of each type of power module and provides control signals over control lines in the backplane to each of the power modules.

9. The charging system of claim 1, wherein the plurality of power modules includes a plurality of charger/rectifier modules, each of the plurality of charger/rectifier modules being configured as either a charging module or a rectifying module.

10. The charging system of claim 9, wherein a charging module configured charger/rectifier module includes a bus bar blade that couples the charger/rectifier module to charging current lines of the backplane.

11. The charging system of claim 10, wherein a monitoring circuit is enabled by the bus bar blade.

12. The charging system of claim 9, wherein the rectifying module includes a bus bar blade that couples the charger/rectifier module with a B bus of the backplane.

13. The charging system of claim 12, wherein the bus bar blade engages a monitoring circuit.

14. The charging system of claim 13, wherein the monitoring circuit determines a configuration of the charger/rectifier module and generates the electrical indication appropriate for that configuration.

15. The charging system of claim 1, wherein the controller disregards power modules of the particular type in which a fault has been detected by determining the number of power modules of the particular type to be the number of active power modules of the particular type.

16. A method of charging a battery, comprising:
determining a number of charging modules that are coupled to a backplane, wherein determining the number of charging modules includes detecting an electrical indication from each charging module, and determining the number from cumulative effects of the electrical indication from each charging module;
determining a number of power modules of each type of power module coupled to the backplane, the power modules of each type providing an electrical function associated with charging a particular type of battery;

determining a charging current based on the number of charging modules and the number of power modules of each type coupled to the backplane;

adjusting a current output of each of the charging modules to supply the charging current based on the determined number of charging modules and the determined charging current; and applying the charging current to a battery.

17. The method of claim 16, wherein the electrical indication is a resistance and determining the number includes coupling the resistance from each of the charging modules in parallel between a voltage and a current source, determining a signal voltage across the parallel resistances, and determining the number from the signal voltage.

18. The method of claim 16, wherein determining the number of charging modules further includes determining the number of charging modules that do not have a fault condition.

19. The method of claim 16, further including controlling the power modules of each type of power modules coupled to the backplane according to its type and the number of power modules of like type.

* * * * *